Figure 1:
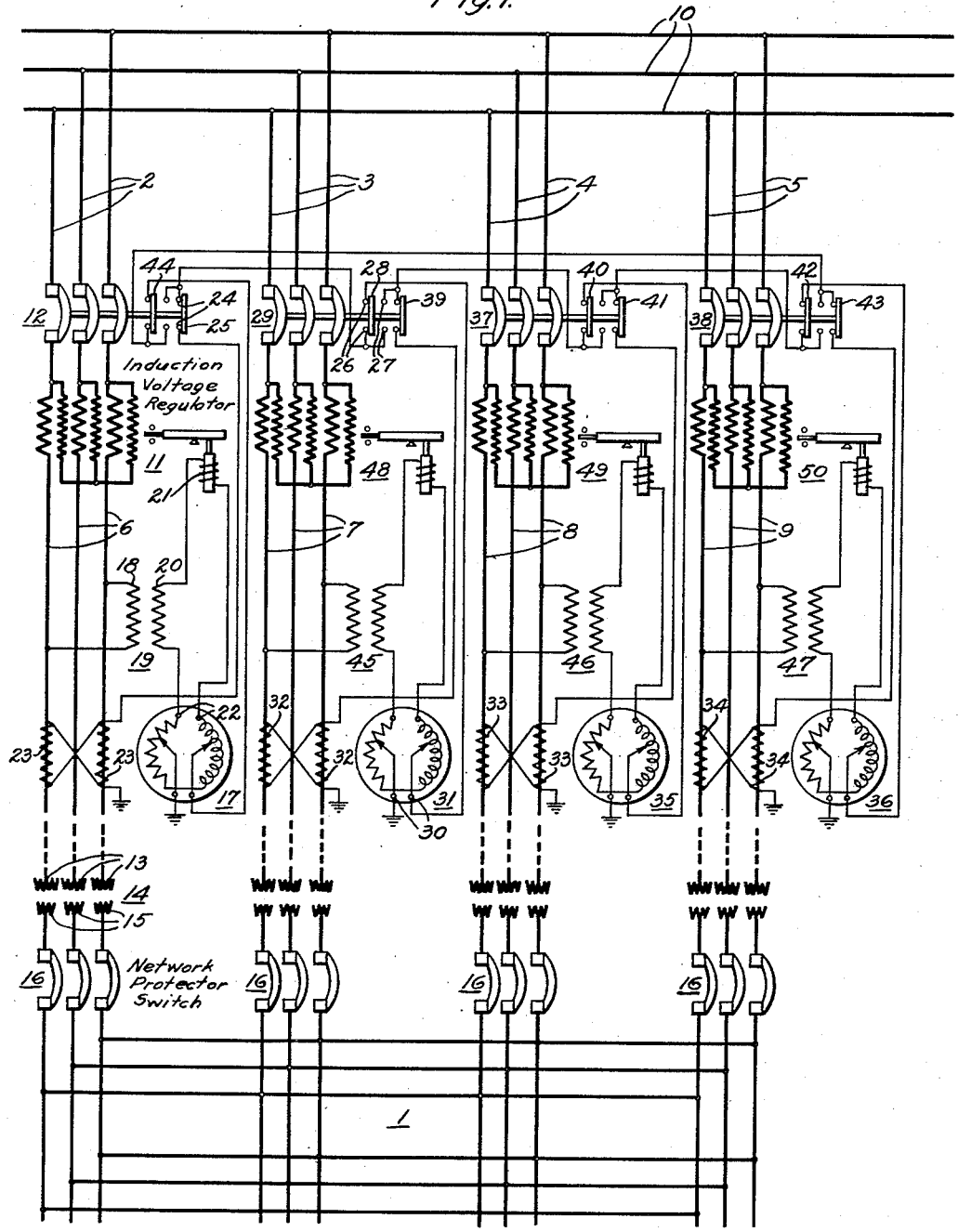

Sept. 13, 1927.　　　　　　　　　　　　　　　　1,642,031
A. H. KEHOE
ELECTRICAL DISTRIBUTION SYSTEM
Filed June 30, 1925　　　　　3 Sheets-Sheet 2

WITNESSES:　　　　　　　　　　　　　　　INVENTOR
　　　　　　　　　　　　　　　　　　　　　Arthur H. Kehoe
　　　　　　　　　　　　　　　　　　　BY
　　　　　　　　　　　　　　　　　　　　　　　ATTORNEY

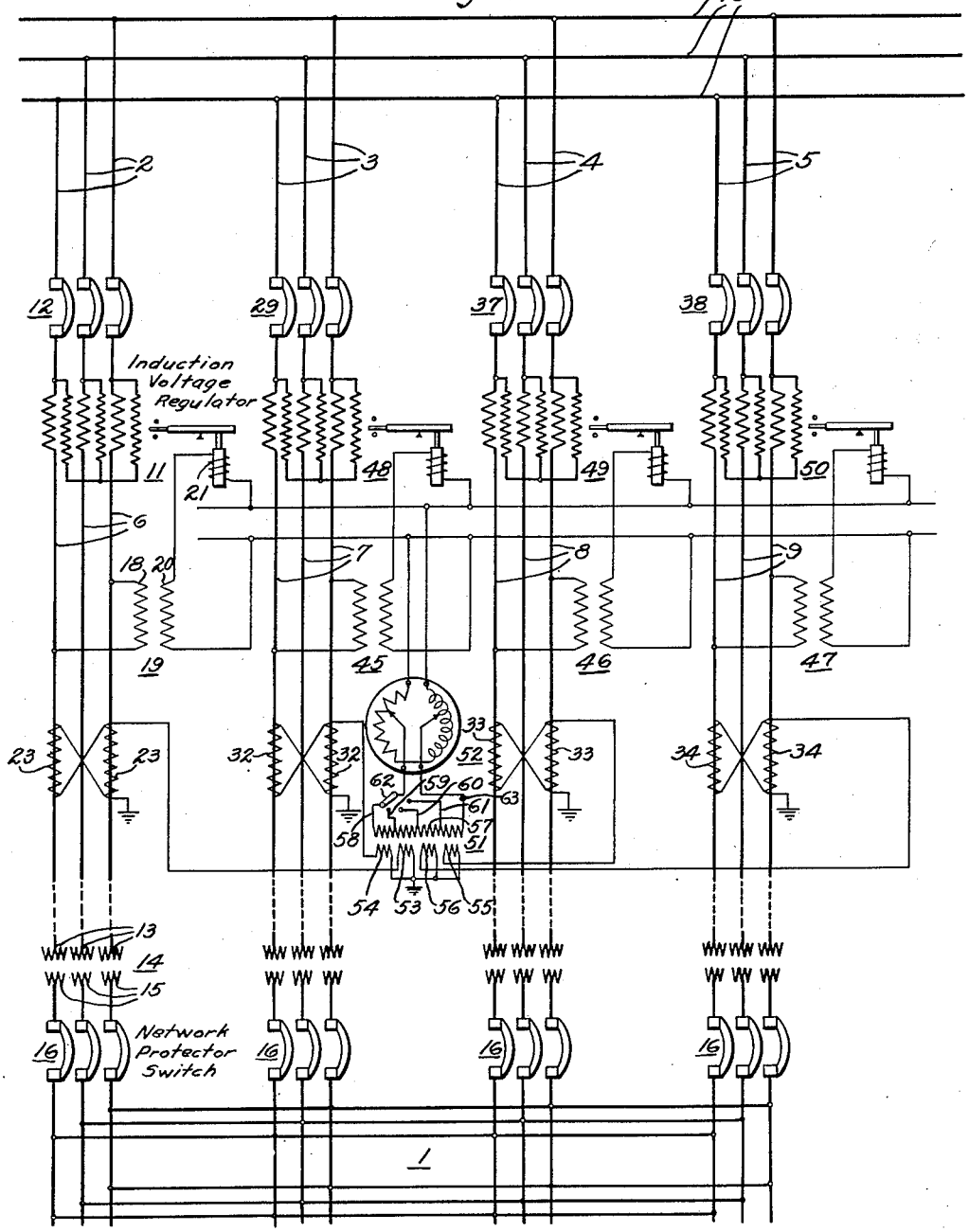

Patented Sept. 13, 1927.

1,642,031

UNITED STATES PATENT OFFICE.

ARTHUR H. KEHOE, OF RUTHERFORD, NEW JERSEY, ASSIGNOR TO WESTINGHOUSE ELECTRIC AND MANUFACTURING COMPANY, A CORPORATION OF PENNSYLVANIA.

ELECTRICAL DISTRIBUTION SYSTEM.

Application filed June 30, 1925. Serial No. 40,486.

My invention relates to electrical distribution systems and more particularly to low voltage network systems that are adapted to receive energy from a plurality of relatively high voltage feeder circuits.

One object of my invention is to provide an electrical distribution system in which means are provided for automatically dividing the load that is supplied to a distribution network substantially in a predetermined ratio between a plurality of feeder circuits.

Another object of my invention is to provide means in a system of the above-indicated character whereby one or more of the feeder circuits may be disconnected from the distribution network without disturbing the operation of the means for automatically distributing the load between the remaining feeder circuits in substantially the predetermined ratio.

Another object of my invention is to provide a system of the above-indicated character in which means are provided for disconnecting a feeder circuit from its source of energy and from the distribution network when a fault occurs on the feeder circuit, but for precluding such disconnection when a fault occurs on the network itself.

In its preferred form, my invention comprises a plurality of sources of energy of relatively high voltage, a distribution network of relatively low voltage and a feeder circuit connected between each source of energy and the distribution network for the purpose of supplying energy to the network. A transformer is provided in each feeder circuit relatively close to the distribution network for reducing the voltage of the feeder circuit to correspond to the desired voltage of the network. A network protector switch is included in each feeder circuit between the transformer and the network for the purpose of preventing energy from being supplied to a feeder circuit from the network.

Each feeder circuit is provided with a feeder circuit interrupter adjacent to the source of energy with which the respective feeder circuit is associated. Between each feeder circuit interrupter and the distribution network, and adjacent to the feeder circuit interrupter, means are provided for regulating the voltage of the feeder circuit in such manner as to compensate for the voltage drop between the source and the network that is occasioned by the current traversing the feeder circuit. The means for effecting such compensation comprise a well-known type of load compensator, and a potential transformer and a plurality of current transformers for energizing the load compensator.

A plurality of auxiliary switches are provided on each of the feeder circuit interrupters and are so connected as to interconnect the load compensator of each feeder circuit with the current or potential transformer of the next succeeding operative feeder circuit in a predetermined sequence of selection. By means of this interconnection I accomplish the objects hereinabove set forth.

Figure 2:
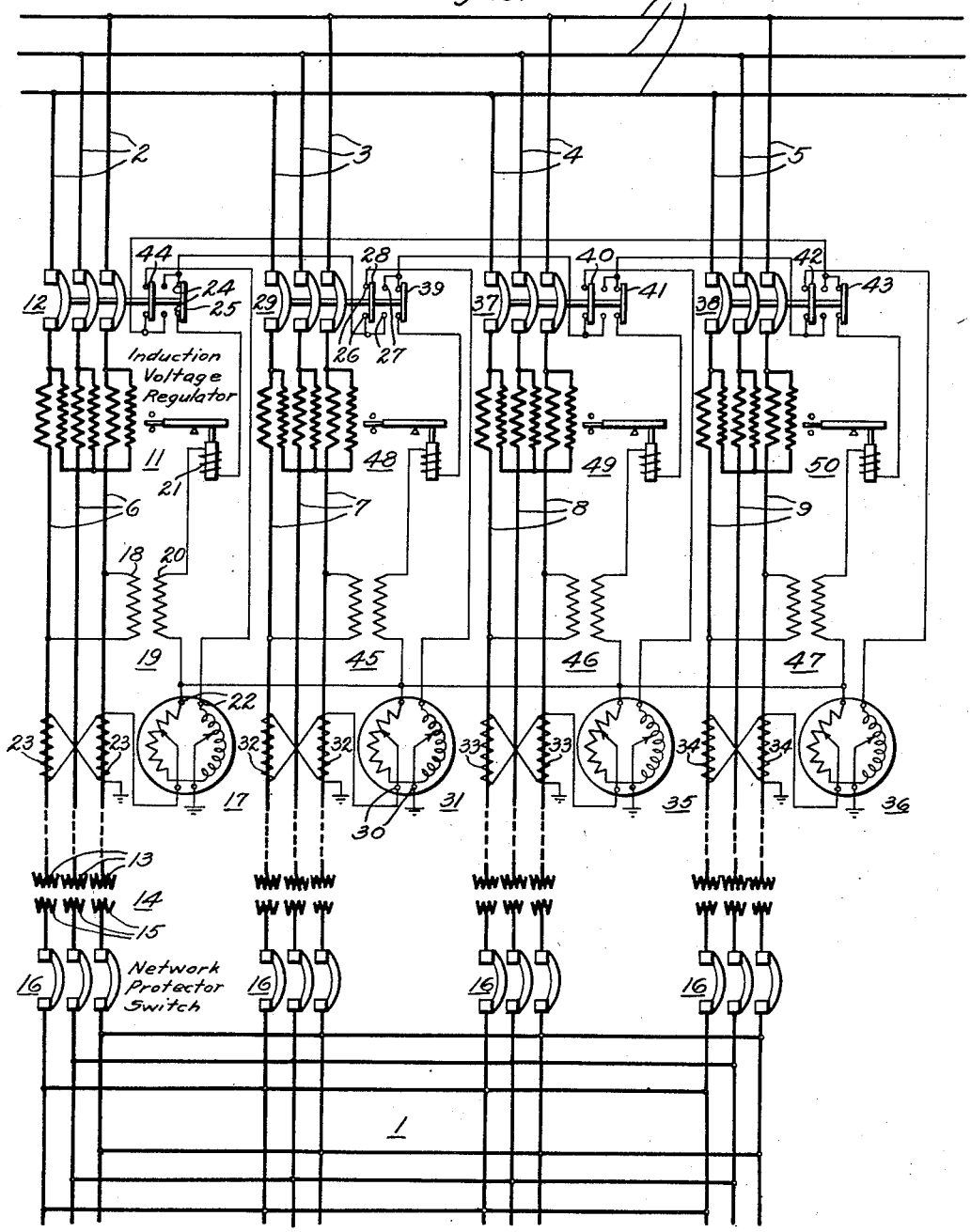

In the accompanying drawings,

Figure 1 is a diagrammatic representation of an electrical system embodying the preferred form of my invention and Figs. 2 and 3 are diagrammatic representations of electrical systems embodying my invention in certain modified forms.

Referring to Fig. 1 of the drawing, a relatively low voltage alternating-current distribution network 1 is adapted to receive energy from a plurality of sources, 2, 3, 4, and 5 through feeder circuits 6, 7, 8 and 9 respectively. The sources 2, 3, 4 and 5 are illustrated as three-phase circuits connected to a common supply circuit 10. It will be readily understood that sources of any desired number of phases may be utilized and that these sources may be connected either to a common supply circuit, as shown, or to a plurality of synchronized supply circuits in any desired manner.

The source of energy 2 is connected to a three-phase induction type voltage regulator 11 by means of a feeder circuit interrupter 12. The feeder circuit 6 extends from the regulator 11 to the primary winding 13 of a voltage reducing transformer 14. The secondary windings 15 of the transformer 14 are connected through a network protector switch 16 to the distribution network 1.

A load compensator 17 is associated with the feeder circuit 6 and is adapted to control the operation of the voltage regulator 11. The load compensator 17 is illustrated as being of the well-known type comprising a resistance and a reactance connected in series and having taps that may be varied to obtain the proper adjustment relative to the characteristics of the circuit with which the compensator is associated. Primary winding 18 of a potential transformer 19 is connected across one phase of the feeder circuit 6, and secondary winding 20 of the transformer 19 is connected in series with an operating coil 21 of the voltage regulator 11 and potential terminals 22 of the load compensator 17.

Current transformers 23 are disposed in the usual manner with respect to two of the conductors of the feeder circuit 6 and are connected in parallel relation to each other. One terminal of each of the transformers 23 is connected to ground and the opposite terminals are connected to one of the contact members 24 of an auxiliary switch 25 that is adapted to be actuated by the feeder circuit interrupter 12. The other of the contact members 24 is connected to one of each of contact members 26 and 27, both of which are adapted to cooperate with an auxiliary switch 28 of a feeder circuit interrupter 29 which is associated with the feeder circuit 7. The other terminal of the switch 28 is connected to one of two current terminals 30 of a load compensator 31 that is associated with the feeder circuit 7. The other current terminal 30 of the load compensator 31 is connected to ground. The contact members 24 and 26 are engaged by the switches 25 and 28 respectively when the circuit interrupters 12 and 29 are closed.

Thus it will be seen that when both the feeder circuits 6 and 7 are connected to their respective sources of energy 2 and 3 by the feeder circuit interrupters 12 and 29, the current transformers 23 of the feeder circuit 6 are connected through the switches 25 and 28 to the current terminals 30 of the load compensator 31 that is associated with the feeder circuit 7. Current transformers 32, 33, and 34 of the feeder circuits 7, 8 and 9 respectively, are connected in exactly the same manner to the current terminals of load compensators 35, 36 and 17 respectively, when corresponding circuit interrupters 29, 37 and 38 of the feeder circuits 7, 8 and 9, respectively, are closed.

These connections are effected by switches 39, 40, 41, 42, 43, and 44 of the feeder circuit interrupters 29, 37, 38 and 12. Potential transformers 45, 46 and 47 are connected to the load compensators 31, 35 and 36 and to voltage regulators 48, 49 and 50 respectively, in the same manner that the potential transformer 19 is connected to the load compensator 17 and to the voltage regulator 11.

It will be noted that when all of the feeder circuit interrupters 12, 29, 37 and 38 are closed, the current transformers 23, 32, 33 and 34 that are associated with the feeder circuits 6, 7, 8 and 9, respectively, are connected to the current terminals of the load compensators 31, 35, 36 and 17 that are associated with the feeder circuits 7, 8, 9 and 6, respectively. That is, the current transformer of each feeder circuit is connected to the current terminals of the load compensator associated with the next succeeding feeder circuit in a predetermined sequence.

When one of the feeder circuits is disconnected from its source of energy by reason of the fact that the feeder circuit interrupter associated therewith is open, the predetermined sequence of interconnection is still preserved with the exception that the inoperative source is omitted from the sequence. Thus if the feeder circuit interrupter 29 is open to disconnect the feeder circuit 7 from its source of energy 3, but the feeder circuit interrupters 12 and 37 are closed to connect the feeder circuits 6 and 8 to the sources of energy 2 and 4, respectively, the current transformers 23 of the feeder circuit 6 are connected through auxiliary switches 25, 28 and 40 of the feeder circuit interrupters 12, 29 and 37, respectively to one of the current terminals of the load compensator 35 that is associated with the feeder circuit 8.

Likewise, if any other feeder circuit is inoperative by reason of the fact that its circuit interrupter is open, but the preceding and succeeding circuits in the predetermined sequence are operative and connected to their respective sources, the current transformers of the circuit preceding the inoperative circuit in the sequence are connected to the current terminals of the load compensator that is associated with the succeeding circuit in the sequence.

If two or more adjacent feeder circuits are disconnected from their respective sources, the current transformers of the circuit preceding the group of inoperative circuits in the predetermined sequence are connected to the current terminals of the load compensator that is associated with the first succeeding operative circuit. For example, if the feeder circuit interrupters 29 and 37 are open to disconnect the feeder circuits 7 and 8 from the sources of energy 3 and 4, respectively, the current transformers 23 of the feeder circuit 6 are connected through the auxiliary switches 25, 28, 40 and 42 of the circuit interrupters 12, 29, 37 and 38 respectively, to the current terminals of the load compensator 36 that is associated with the feeder circuit 9.

If only one of the feeder circuits is connected to its source of energy, its current transformers will be connected through the auxiliary switches associated with all of the feeder circuit interrupters to the current terminals of the load compensator that is associated with the single operative circuit. For example, if the circuit interrupter 12 is closed to connect the feeder circuit 6 to its source of energy 2, but all of the circuit interrupters 29, 37 and 38 are open, the current transformers 23 of the feeder circuit 6 are connected through the auxiliary switches 25, 28, 40, 42 and 44 of the circuit interrupters 12, 29, 37, 38 and 12, respectively, to the current terminals of the load compensator 17 that is also associated with the feeder circuit 6.

From the foregoing description, it is clear that whenever more than one of the feeder circuits are connected to their respective sources of energy, the current transformers of each connected feeder circuit are automatically connected to the current terminals of the load compensator that is associated with the next succeeding connected feeder circuit in the predetermined sequence. The current transformers of any feeder circuit are connected to the current terminals of the load compensator associated with the same feeder circuit only when all other feeder circuits are disconnected from their respective sources of energy.

By means of this automatic interconnection between the current transformers and load compensators of the different circuits, the total load on the distribution network is automatically distributed between all of the operative feeder circuits substantially in a predetermined ratio. This is obvious when it is considered that an excessive load on one of the feeder circuits so affects the load compensator of another feeder circuit that the voltage regulator of the other feeder circuit is actuated to increase the voltage thereof. When the voltage of said feeder circuit is increased in this manner the circuit automatically takes a greater portion of the total load on the distribution network and the load on the formerly overloaded feeder circuit is automatically reduced.

The ratio in which the total load on the distribution network is to be distributed between the several feeder circuits may be definitely predetermined by properly adjusting the several load compensators and by modifying the characteristics of the controlling circuits in any suitable manner.

The system shown in Fig. 2 of the drawings corresponds exactly with the system shown in Fig. 1 with the exception that the current transformers of each feeder circuit are permanently connected to the current terminals of the load compensator that is associated with the same feeder circuit, while the secondary circuits of the potential transformers of the several feeder circuits are automatically interconnected by means of the auxiliary switches of the feeder circuit interrupters, in the same manner that the current transformers are interconnected in the system shown in Fig. 1.

The difference in operation between the two systems is that in the system shown in Fig. 1 the several load compensators may be adjusted to operate properly when the several feeder circuits have different impedance characteristics due to different sizes and lengths of conductors, while the system shown in Fig. 2 is applicable only where the potential drop corresponding to any total load on the distribution network is the same for each feeder circuit, i. e., where the impedance of each feeder circuit is the same, or is inversely proportional to the predetermined proportion of the total load that that feeder circuit is intended to supply. This difference will be appreciated when it is considered that the type of load compensators utilized in these systems is such that adjustment thereof is effected by varying the portion of the total reactance and resistance included in the compensator that is traversed by current supplied by current transformers of the feeder circuits.

The modification of my invention shown in Fig. 3 of the drawing differs from the form shown in Fig. 1 in that a single load compensator is provided for a group of feeder circuits, instead of a separate load compensator being provided for each feeder circuit. This system is applicable where the impedance of each feeder circuit is the same and where it is desired that the proportion of the total load on the distribution circuit that shall be supplied by each feeder circuit is the same. Therefore, the potential drop in each feeder circuit is always the same, and the potential transformers of the several circuits may be permanently connected in parallel relation to each other as shown in Fig. 3.

In order to provide for satisfactory operation of this system when one or more than one of the feeder circuits is disconnected from the system, it is necessary to provide a variable-ratio totalizing transformer 51 that is connected in circuit between the current transformers of the several feeder circuits and the current terminals of the single load compensator 52 as shown. The transformer 51 comprises a plurality of primary windings 53, 54, 55 and 56 which are connected in parallel relation to the current transformers 23, 32, 33 and 34, respectively.

Secondary winding 57 of the transformer 51 is provided with a plurality of taps 58, 59, 60 and 61, which are connected to the contact members of a single-pole, multiple-position switch 62, the blade of which is connected to one of the current terminals of the load compensator 52. The other current terminals of the compensator 52 is connected to a common terminal 63 of the secondary winding 57. When all of the feeder circuits are connected to their respective sources of energy, the switch 62 is placed in the position shown in the drawing, in which the entire secondary winding 57 is connected to the current terminals of the load conpensator 52.

When any one of the feeder circuits is disconnected from its source of energy, the switch 62 is moved to a position in which it completes a circuit from the tap 59 of the secondary winding 57 to the load compensator. The taps 58, 59, 60 and 61 are connected to the winding 57 at equidistant points, and the number of these taps corresponds to the total number of feeder circuits. Thus, the switch 62 may always be so operated that the operative portion of the winding 57 bears the same ratio to the total winding as the number of operative feeder circuits bears to the total number of feeder circuits. In this manner, the current supplied to the current terminals of the load compensator 52 may always be maintained in a direct proportion to the total load that is being supplied to the distribution network by the operative feeder circuits.

From the foregoing description of the operation of the various forms of my invention, the advantages which may be obtained by utilizing the same are obvious. It is to be emphasized, however, that the utilization of my invention in connection with an extensive distribution network is particularly advantageous. In large cities where continuity of service on low-voltage network systems is of prime importance, it is desired that a fault on the network be burned clear rather than that the network should be de-energized even for a short time.

In the systems previously used, when such a fault occurred, the feeder circuits that are connected to the network at the points nearest to the fault become heavily overloaded, with the result that the feeder circuit interrupters associated therewith in the power station are automatically tripped. The fault on the network will then receive energy from the next nearest connected feeder circuit with the result that this circuit will be disconnected. In some cases, where the fault is a severe one, all of the feeder circuit interrupters for an entire section of the network will be successively tripped.

This undesirable and dangerous operation may be avoided by providing means for automatically distributing the total load on the distribution network between all of the operative feeder circuits substantially in the predetermined ratio. A fault at any point on the network will then receive energy from all of the operative feeder circuits substantially in the predetermined ratio, with the result that the fault will be quickly burned clear without excessively over-loading any single feeder circuit or group of feeder circuits. This result may be obtained by utilizing my invention as set forth in the foregoing descriptive matter.

Another important advantage afforded by my invention is the great improvement in voltage regulation throughout the network. By reason of the even distribution of the total network load between the several feeder circuits, the voltage of the network at all points is maintained constantly within very close limits above and below the desired value. This feature is of great importance in normal operation of the network.

While it is desirable that faults on the low-voltage distribution network be burned clear, it is not desired that faults on the relatively high-voltage feeder circuits be treated in the same manner, for the reason that the relatively high voltage tends to maintain arcs which are very injurious to the lines and apparatus of the system. Consequently, each feeder circuit is provided with an automatic feeder circuit interrupter, as previously set forth, which automatically disconnects a feeder circuit from its source of energy when it is traversed by current of excessive value.

The distribution network is then protected against feeding energy back into the faulty feeder circuit by the network protector switch, which automatically opens when it is traversed by energy in the reverse of normal direction. The form of network protector switch applicable for this service constitutes the subject matter of a copending patent application of John S. Parsons, Serial No. 39,947, filed June 27, 1925, and assigned to the Westinghouse Electric & Manufacturing Company.

I do not wish to be limited to the particular forms of my invention shown and described in this application, as various changes and modifications may be made therein without departing from the spirit and scope of my invention, as set forth in appended claims.

I claim as my invention:

1. In an electrical system of distribution, the combination with a distribution network and a plurality of feeder circuits for supplying energy thereto, each of said feeder circuits comprising a source of energy, a feeder circuit interrupter, a voltage regulator, a load compensator, and a network protector switch, of means for energizing each load compensator partially in accordance with a predetermined electrical characteristic of the feeder circuit associated therewith, and partially in accordance with a second predetermined electrical characteristic of the next operative feeder circuit in a predetermined sequence of selection.

2. In an electrical system of distribution, the combination with a distribution network and a plurality of feeder circuits for supplying energy thereto, each of said feeder circuits comprising a source of energy, a feeder circuit interrupter, a voltage regulator, a load compensator, and a network protector switch, of means for energizing each load compensator in accordance with a predetermined electrical characteristic of the first operative feeder circuit following the feeder circuit associated with said compensator in a predetermined sequence of selection.

3. In an electrical system of distribution, the combination with a distribution network and a plurality of feeder circuits for supplying energy thereto, each of said feeder circuits comprising a source of energy, a feeder circuit interrupter, a voltage regulator, a load compensator, and a network protector switch, of means for energizing each load compensator in accordance with a predetermined electrical characteristic of the first operative feeder circuit following the feeder circuit associated with said compensator in a predetermined sequence of selection, and in accordance with the same electrical characteristic of the associated feeder circuit when all of the other feeder circuits are inoperative.

4. In an electrical system of distribution, the combination with a distribution network and a plurality of feeder circuits for supplying energy thereto, each of said feeder circuits comprising a source of energy, a feeder circuit interrupter, a voltage regulator, a load compensator, and a network protector switch, of means operative when two or more of the feeder circuits are operative for energizing each load compensator partially in accordance with a predetermined electrical characteristic of the feeder circuit associated therewith and partially in accordance with a second predetermined electrical characteristic of the next operative feeder circuit in a predetermined sequence of selection, and operative when only one of the feeder circuits is operative for energizing the load compensator associated with said operative feeder circuit in accordance with both of said characteristics of said circuit.

5. In an electrical system of distribution, the combination with a distribution network and a plurality of feeder circuits for supplying energy thereto, each of said feeder circuits comprising a source of energy, a feeder circuit interrupter, a voltage regulator, a load compensator and a network protector switch, of means for energizing each load compensator partially in accordance with the voltage of the feeder circuit associated therewith, and partially in accordance with the current traversing the next operative feeder circuit in a predetermined sequence of selection.

6. In an electrical system of distribution, the combination with a distribution network and a plurality of feeder circuits for supplying energy thereto, each of said feeder circuits comprising a source of energy, a feeder circuit interrupter, a voltage regulator, a load compensator, and a network protector switch, of means for energizing each load compensator in accordance with the current traversing the first operative feeder circuit following the feeder circuit associated with said compensator in a predetermined sequence of selection.

7. In an electrical system of distribution, the combination with a distribution network and a plurality of feeder circuits for supplying energy thereto, each of said feeder circuits comprising a source of energy, a feeder circuit interrupter, a voltage regulator, a load compensator, and a network protector switch, of means for energizing each load compensator in accordance with the current traversing the first operative feeder circuit following the feeder circuit associated with said compensator in a predetermined sequence of selection, and in accordance with the current traversing the associated feeder circuit when all of the other feeder circuits are inoperative.

8. In an electrical system of distribution, the combination with a distribution network and a plurality of feeder circuits for supplying energy thereto, each of said feeder circuits comprising a source of energy, a feeder circuit interrupter, a voltage regulator, a load compensator, and a network protector switch, of means operative when two or more of the feeder circuits are operative for energizing each load compensator partially in accordance with the voltage of the feeder circuit associated therewith and partially in accordance with the current traversing the next operative feeder circuit in a predetermined sequence of selection, and operative when only one of the feeder circuits is operative for energizing the load compensator associated with said operative feeder circuit in accordance with both the voltage of, and the current traversing, said circuit.

9. In an electrical system of distribution, the combination with a distribution network and a plurality of feeder circuits for supplying energy thereto, of a source of energy, a feeder circuit interrupter, a voltage regulator, a load compensator comprising potential and current terminals, a potential transformer, a current transformer, and a network protector switch associated with each feeder circuit, means for connecting the secondary winding of the potential transformer associated with each feeder circuit to the potential terminals of the load compensator associated with the same feeder circuit, and a plurality of auxiliary switches associated with the feeder circuit interrupters for connecting the current transformer associated with each feeder circuit to the current terminals of the load compensator associated with the next succeeding operative feeder circuit in a predetermined sequence of selection.

10. In an electrical system of distribution, the combination with a distribution network and a plurality of feeder circuits for supplying energy thereto, of a source of energy, a feeder circuit interrupter, a voltage regulator, a load compensator comprising potential and current terminals, a potential transformer, a current transformer, and a network protector switch associated with each feeder circuit, means for connecting the secondary winding of the potential transformer associated with each feeder circuit to the potential terminals of the load compensator associated with the same feeder circuit, and a plurality of auxiliary switches associated with the feeder circuit interrupters for connecting the current transformers associated with each feeder circuit to the current terminals of the load compensator associated with the next succeeding operative feeder circuit in a predetermined sequence of selection, when two or more of the feeder circuits are energized, and for connecting the current transformer associated with any feeder circuit to the current terminals of the load compensator associated with the same feeder circuit when only said feeder circuit is energized.

11. In an electrical system of distribution, the combination with a distribution network, of a plurality of feeder circuits connected to the network to supply energy thereto at various points, the impedance of the network between said points being relatively small but appreciable, and regulating and compensating means associated with each feeder circuit and so interconnected that an excessive supply of energy to the network, caused by a fault at any point thereon, will be supplied by all of the feeder circuits substantially in a predetermined ratio.

12. In an electrical system of distribution, the combination with a distribution network, of a plurality of load transformers connected in parallel relation to the network to supply energy thereto at various points, the impedance of the network between said points being relatively small but appreciable, and regulating and compensating means associated with the primary circuit of each transformer and so interconnected that an excessive supply of energy to the network caused by a fault at any point thereon, will be supplied by all of the transformers substantially in a predetermined ratio.

13. In an electrical system of distribution, the combination with a relatively low-voltage distribution network, a plurality of sources of energy, and a relatively high-voltage feeder circuit connected between each source of energy and the distribution networks, of means for disconnecting each feeder circuit from its source of energy and from the distribution network when a fault occurs on the feeder circuit, a load compensator associated with each feeder circuit, and means for so interconnecting the load compensators of the several feeder circuits that a fault on the distribution network will be supplied with sufficient current to burn the fault clear, said current being supplied by all of the feeder circuits substantially in a predetermined ratio.

In testimony whereof, I have hereunto subscribed my name this 29th day of June, 1925.

ARTHUR H. KEHOE.